United States Patent [19]

Nagino et al.

[11] Patent Number: 5,866,047
[45] Date of Patent: Feb. 2, 1999

[54] PROCESS FOR PRODUCING A SHAPED PRODUCT

[75] Inventors: Haruko Nagino; Ichiro Ando, both of Kasugai, Japan

[73] Assignee: Menicon Co., Ltd., Nagoya, Japan

[21] Appl. No.: 879,814

[22] Filed: Jun. 20, 1997

[30] Foreign Application Priority Data

Jun. 21, 1996 [JP] Japan ..................................... 8-161539
May 9, 1997 [JP] Japan ..................................... 9-119788

[51] Int. Cl.⁶ ............................. B29D 11/00; B29C 35/08

[52] U.S. Cl. ...................... 264/1.27; 264/1.38; 264/494; 264/496

[58] Field of Search .................................. 264/16, 17, 18, 264/19, 494, 496, 1.27, 1.36, 1.38

[56] References Cited

U.S. PATENT DOCUMENTS 5,318,999 6/1994 Mitra et al. .
5,449,703 9/1995 Mitra et al. ............................. 264/16

FOREIGN PATENT DOCUMENTS 0 214 815 3/1987 European Pat. Off. .

*Primary Examiner*—Mathieu D. Vargot
*Attorney, Agent, or Firm*—Oblon, Spivak, McClelland, Maier & Neustadt, P.C.

[57] ABSTRACT

A process for producing a shaped product, which includes polymerizing a mixture comprising an iniferter and a radical polymerizable monomer to obtain a half polymer having a rate of polymerization of from 5 to 90 wt %, filling the half polymer in a predetermined cavity and then applying a polymerization energy again to the half polymer to complete polymerization.

4 Claims, No Drawings

PROCESS FOR PRODUCING A SHAPED PRODUCT

The present invention relates to a process for producing a shaped product. More particularly, it relates to a process for producing a shaped product, which is useful for the production of molded products, for example, ocular lenses such as contact lenses or intraocular lenses, camera lenses, pickup lenses for compact discs (CD) or lenses for spectacles, or for the production of compound products such as dental fillers.

Heretofore, ocular lenses such as contact lenses or intraocular lenses, have been produced by a so-called mold polymerization method wherein a monomer is charged into a mold and polymerized in the mold by using azobisisobutyronitrile or a peroxide as a polymerization initiator.

However, when such a mold polymerization method is employed, there is a drawback that polymerization shrinkage occurs as the polymerization of the monomer progresses in the mold, whereby it is difficult to prepare a molded product corresponding precisely to the shape of the mold.

Further, in a dental treatment field, a method is employed in which a defective portion of a tooth is filled and mended by a polymerization curable resin. However, polymerization shrinkage likewise occurs by polymerization curing. Consequently, there will be a problem such that a space is created between the natural tooth and the filled resin, and the mechanical strength tends to be low or dentine is likely to be eroded from the space.

Further, a technique so-called "Stereo Lightgraphy", has recently been employed in which a polymer is laminated by photopolymerization to obtain a three dimensional shaped product. In such a method, it is common in many cases to employ an epoxy resin which is less susceptible to polymerization shrinkage. However, if a resin susceptible to polymerization shrinkage, such as an acryl monomer, is used, dimensional precision of the shaped product tends to be low, and it tends to be difficult to obtain a shaped product having a desired shape. Thus, this technique has a problem that the types of useful resins are substantially limited.

As is apparent from the above examples, it is important to reduce polymerization shrinkage in many fields where polymerization curing of a monomer is utilized.

It is usually considered that polymerization shrinkage occurs at the time of polymerization of a monomer, because the van der Waals distance among the monomer molecules changes to a covalent bond distance by the polymerization. Accordingly, the smaller the amount of the monomer involved in the polymerization, the less the polymerization shrinkage. In a case where polymerization is resumed from a half polymerized state, the degree of polymerization shrinkage decreases to a level corresponding to the amount of the remaining monomer. For example, in radical bulk polymerization of methyl methacrylate, it is known that when polymerization is carried out from the monomer, the polymerization shrinkage will be about 21%. In a case where a half polymer polymerized to a level of 50%, is further polymerized, the polymerization shrinkage will be reduced to a level of 10%.

Paying an attention to such a point, it has been proposed to fill a half polymerized material in a predetermined mold or cavity and to polymerize it again to reduce the polymerization shrinkage.

In such a proposal, it has been common to use, as a polymerization initiator, an azo compound such as azobisisobutyronitrile, a thermal polymerization initiator such as a peroxide compound such as benzoyl peroxide, or a photopolymerization initiator such as benzophenone, benzyl or a benzoin compound. In the polymerization with these polymerization initiators, once active free radicals are dissociated from the polymerization initiator, they immediately attach to the monomer, and the polymer chains will continue to grow, unless deactivation due to a chain transfer or termination reaction takes place during the polymerization. Accordingly, once polymerization is initiated, it is not possible to terminate the polymerization unless the growing species are deactivated. Once growing species are deactivated, the polymerization ability will not be regained. Such a characteristic makes it difficult to obtain a half polymer in a desired state quantitatively. For example, it is difficult to completely terminate polymerization even if the material wherein the polymerization is once initiated, is transferred to a low temperature environment to reduce the apparent reaction rate, whereby there will be a problem that polymerization gradually proceeds during the storage, and the material is thereby cured and becomes useless. Further, from the viewpoint of resuming polymerization from a half polymerized state, it is impossible to resume polymerization of a half polymer which has once been deactivated, from such a deactivated state, and an additional mixing operation will be required to incorporate a fresh polymerization initiator, and such a method can hardly be useful for a common user such as a dentist who has no equipment required for such an operation.

SUMMARY OF THE INVENTION

The present invention has been made in view of the above-described prior art, and it is an object of the present invention to provide a process for producing a shaped product by a method of reducing polymerization shrinkage to prepare a molded product highly precisely in the shape of the mold or to prepare a compound product free from forming a space, wherein the method for reducing the polymerization shrinkage comprises preparing a half polymer and resuming polymerization by an optional method, whereby the half polymer can quantitatively be obtained, polymerization will not proceed during the storage, and polymerization can be resumed from the half polymerized state without necessity of adding any active agent.

The present invention provides a process for producing a shaped product, which comprises polymerizing a mixture comprising an iniferter and a radical polymerizable monomer to obtain a half polymer having a rate of polymerization of from 5 to 90 wt %, filling the half polymer in a predetermined cavity and then applying a polymerization energy again to the half polymer to complete polymerization.

In the present invention, the iniferter is meant for a radical initiator having a polymerization terminating function by radical chain transfer.

DESCRIPTION OF THE PREFERRED EMBODIMENTS

Now, the present invention will be described in detail with reference to the preferred embodiments.

According to the present invention, a shaped product can be prepared highly precisely, as mentioned above, by polymerizing a mixture comprising an iniferter and a radical polymerizable monomer to obtain a half polymer having a rate of polymerization of from 5 to 90 wt %, filling the half polymer into a predetermined cavity and then applying a polymerization energy again to the half polymer to complete polymerization. The process for producing a shaped product of the present invention has a feature in that an iniferter is used.

In a case where a conventional radical polymerization initiator for initiating polymerization by forming active free radicals by thermal cleavage, such as azobisisobutyronitrile, is used as a polymerization initiator, the progress of the polymerization reaction at growing terminals of the polymer will stop when active radicals at the growing terminals of the polymer undergo a chain transfer or termination reaction. At the growing terminals at which the progress of the polymerization reaction has been thus terminated, the polymerization reaction no longer resumes.

Whereas, the iniferter I-T used in the present invention forms a initiator fragment I· and a relatively stable radical T· upon irradiation with an energy such as ultraviolet rays or heat, as shown by the formula (A):

$$I\text{-}T \rightarrow I\cdot + T\cdot \tag{A}$$

wherein I· is an initiator fragment, and T· is a relatively stable radical. This initiator fragment I· induces monomer M to initiate polymerization as shown by the formula (B):

$$I\cdot + M \rightarrow I\text{-}M\cdot \tag{B}$$

wherein M is a monomer, whereby a growing reaction proceeds as shown by the formula (C):

$$IM\cdot + nM \rightarrow IM_{n+1}\cdot \tag{C}$$

Thereafter, the growing terminal of polymerized polymer $IM_{n+1}\cdot$ chain-transfers to free relatively stable radical T· as shown by the formula (D):

$$IM_{n+1}\cdot + T\cdot \rightarrow IM_{n+1}T \tag{D}$$

The terminal of this formed polymer $IM_{n+1}T$ again undergoes cleavage as shown by the formula (E) so long as it is subjected to an energy such as ultraviolet rays or heat:

$$IM_{n+1}T \rightarrow IM_{n+1}\cdot + T\cdot \tag{E}$$

and the growing terminal $IM_{n+1}\cdot$ of the polymer will again add to monomer M, so that the polymer chain is extended as shown by the formula (F):

$$IM_{n+1}\cdot + M \rightarrow IM_{n+2}\cdot \tag{F}$$

The relatively stable radical T· formed from the iniferter may or may not have a polymerization initiating ability.

As described above, the iniferter used in the present invention shows a living polymerization behavior as represented by the formulas (A) to (F). In other words, the iniferter has a nature such that when subjected to an energy, it promotes the polymerization reaction of the monomer, and when it is no longer subjected to an energy, it readily stops the polymerization reaction of the monomer, and when it is subjected to energy again, it again serves to initiate the polymerization reaction of the monomer.

Accordingly, if a monomer is polymerized to an optional half polymerized state for example by irradiating ultraviolet rays, and if irradiation of the ultraviolet rays is stopped, the half polymerized state can be maintained without a further progress of polymerization. When required, this half polymer is filled in a predetermined mold or cavity and again irradiated with ultraviolet rays, whereupon polymerization will be initiated, and the monomer will eventually be consumed to complete polymerization and to obtain a shaped product. In contrast with conventional radical polymerization initiators which irreversibly induce a chain transfer or termination reaction, the iniferter of the present invention provides a reversible polymerization characteristic such that regeneration of growth active species can be carried out solely by the presence or absence of an external energy such as ultraviolet rays.

The iniferter to be used in the present invention is referably at least one member selected from the group onsisting of a carbamate compound, an aminoxyl compound, a selenium compound, a diselenide compound and a diphenylethane derivative.

A typical example of the above carbamate compound may, for example, be a carbamate compound having a group of the formula:

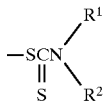

wherein each of $R^1$ and $R^2$ which are independent of each other, is a hydrogen atom or a $C_{1\text{-}10}$ alkyl group. A typical example of the above carbamate compound may be a carbamate compound of the formula (I):

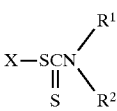

(I)

wherein each of $R^1$ and $R^2$ which are independent of each other, is a hydrogen atom or a $C_{1\text{-}10}$ alkyl group, and X is an organic group selected from a $C_{1\text{-}10}$ alkyl group and a benzyl group, a carbamate compound of the formula (II):

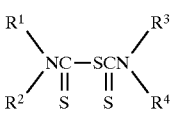

(II)

wherein each of $R^1$, $R^2$, $R^3$ and $R^4$ which are independent of one other, is a hydrogen atom or a $C_{1\text{-}10}$ alkyl group, a carbamate compound of the formula (III):

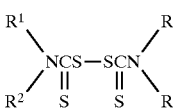

(III)

wherein $R^1$, $R^2$, $R^3$ and $R^4$ are as defined above, a carbamate compound of the formula (IV):

(IV)

wherein $R^1$, $R^2$, $R^3$ and $R^4$ are as defined above, and m is 1 or 2, or a carbamate compound of the formula (V):

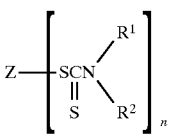

(V)

wherein each of $R^1$ and $R^2$ which are independent of each other, is a hydrogen atom or a $C_{1\text{-}10}$ alkyl group, Z is an organic group such as a 2 to 40 valent hydrocarbon group, or a group containing a 2 to 6 valent benzene substitution product, and n is an integer of from 2 to 40.

Specific examples of the carbamate compounds of the formulae (I) to (V) include n-butyl N,N-dimethyldithiocarbamate, benzyl dithiocarbamate, benzyl N,N- dimethyl-dithiocarbamate, benzyl N,N-diethyl-dithiocarbamate, thiuram monosulfide, N,N'-dimethylthiuram monosulfide, N,N,N',N'-tetramethylthiuram monosulfide, N,N'-diethylthiuram monosulfide, N,N,N',N,'-tetraethylthiuram monosulfide, thiuram disulfide, N,N-dimethylthiuram disulfide, N,N,N',N'-tetramethylthiuram disulfide, N,N'-diethylthiuram disulfide, N,N'-dimethylthiuram tetrasulfide, N,N,N',N'-tetraethylthiuram disulfide, p-xylenebis(dithiocarbamate), p-xylenebis(N,N-dimethyldithiocarbamate), p-xylenebis(N,N-diethyldithiocarbamate), 1,2-bis(N,N-diethyldithiocarbamyl)ethane, 1,2-bis(N,N-dimethyldithiocarbamyl)ethane, 1,2,3-tris(N,N-dimethyldithiocarbamyl)propane, 1,2,4,5-tetrakis(N,N-diethyldithiocarbamylmethyl)benzene and 1-(N,N-diethyldithiocarbamyl)ethyl acetate. These carbamate compounds may be used alone or in combination as a mixture of two or more of them.

A typical example of the above aminoxyl compound may be an aminoxyl compound of the formula (VI):

(VI)

wherein each of $R^5$ and $R^6$ which are independent of each other, is a $C_{1-10}$ straight chain or branched chain alkyl or alkylene group which may or may not have a substituent selected from a hydroxyl group, a cyano group, an amino group, a group having an ester bond, a carbonyl group and a group containing an aromatic group substitution product, and $R^7$ is a $C_{1-10}$ alkyl group or a group containing an aromatic group substitution product, provided that when $R^5$ and $R^6$ are alkylene groups, $R^5$ and $R^6$ are connected via an organic group.

Specific examples of the aminoxyl compound of the formula (VI) include ((2',2',6',6'-tetramethyl-1'-piperidinyloxy)methyl)benzene, 1-phenyl-1-(2',2',6',6'-tetramethyl-1'-piperidinyloxy)ethane, 1-(4'-bromophenyl)-1-(2",2",6",6"-tetramethyl-1"-piperidinyloxy)ethane, 1-naphthyl-1-(2',2',6',6'-tetramethyl-1'-piperidinyloxy)ethane, 1-phenyl-1-(2',2',6',6'-tetramethyl-1-piperidinyloxy)propane, 1-(benzyloxy)-2-phenyl-2-(2',2',6',6'-tetramethyl-1'-piperidinyloxy)ethane, 1-hydroxy-2-phenyl-2-(2',2',6',6'-tetramethyl-1-piperidinyloxy)ethane, phenyl 4-cyano-4-(2',2',6',6'-tetramethyl-1'-piperidinyloxy)pentanoate, pantafluorophenyl 4-cyano-4-(2',2',6',6'-tetramethyl-1'-piperidinyloxy)pentanoate, 3-phenyl-1-(2',2',6',6'-tetramethyl-1'-piperidinyloxy)propane and 1-((2',2',6',6'-tetramethyl-1'-piperidinyloxy)methyl)-4-(trifluoromethyl)benzene. These aminoxyl compounds may be used alone or in combination as a mixture of two or more of them.

A typical example of the above selenium compound may be a selenium compound of the formula (VII):

(VII)

wherein each of $R^9$ and $R^{10}$ which are independent of each other, is a hydrogen atom, a $C_{1-10}$ alkyl group or a group containing a 2 to 6 valent benzene substitution product.

Specific examples of the selenium compound of the formula (VII) include benzylphenyl selenide, p-methylbenzylphenyl selenide, p-ethylbenzylphenyl selenide and benzyltolyl selenide. These selenium compounds may be used alone on in combination as a mixture of two or more of them.

A typical example of the above diselenide compound may be a diselenide compound of the formula (VIII):

(VIII)

wherein each of $R^{11}$ and $R^{12}$ which are independent of each other, is a hydrogen atom, a $C_{1-10}$ alkyl group or a group containing a 2 to 6 valent benzene substitution product.

Specific examples of the diselenide compound of the formula (VIII) include xylenyldiphenyl diselenide, xylenylditolyl diselenide, diphenyl diselenide, ditolyl diselenide, di-(p-cumenyl)diselenide, di(1-naphthyl)diselenide, di-(2-naphthyl)diselenide and di(p-t-butylphenyl)diselenide. These diselenide compounds may be used alone on in combination as a mixture of two or more of them.

A typical example of the above diphenylethane derivative may be a diphenylethane derivative of the formula (IX):

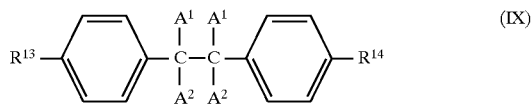
(IX)

wherein each of $R^{13}$ and $R^{14}$ which are independent of each other, is a hydrogen atom, a $C_{1-10}$ alkyl group or a group containing a 2 to 6 valent benzene substitution product, each of $A^1$ and $A^2$ which are independent of each other, is a hydrogen atom or a functional group selected from a $C_{1-10}$ alkyl group, a cyano group, a halogen atom, a carboxyl group, a group having an ester bond, an amide group and a group containing a benzene substitution product such as a phenyl group.

Specific examples of the diphenylethane derivative of the formula (IX) include diethyl 1,2-dicyano-1,2-diphenylsuccinate, 3,4-dimethyl-3,4-diphenylhexane, 3,4-diethyl-3,4-diphenylhexane, 4,5-dimethyl-4,5-diphenyloctane, 2,3-dimethyl-2,3-diphenylbutane, 2,2,3,3-tetraphenylbutane, 1,2-dicyano-1,1,2,2-tetraphenylethane, and 3,3,4,4-teraphenylhexane. These diphenylethane derivatives may be used alone on in combination as a mixture of two or more of them.

The radical polymerizable monomer to be used in the present invention may be suitably selected for use depending upon the particular purpose of the shaped product, among those polymerizable by the above described iniferter. Especially, a monomer containing a polymerizable unsaturated double bond selected from the group consisting of an acryloyl group, a methacryloyl group, a vinyl group and an allyl group is particularly suitable for use in the present invention, since such a monomer is excellent in the polymerizability by the iniferter. Typical examples of such a monomer include an alkyl (meth)acrylate such as methyl (meth)acrylate, ethyl (meth)acrylate, propyl (meth)acrylate or butyl (meth)acrylate; a fluoroalkyl (meth)acrylate such as trifluoroethyl (meth)acrylate, tetrafluoropropyl (meth)acrylate, hexafluoroisopropyl (meth)acrylate or octafluoropentyl (meth)acrylate; a silicon-containing (meth)acrylate such as trimethylsilylpropyl (meth)acrylate or tris (trimethylsiloxy)silylpropyl (meth)acrylate; a hydroxyalkyl (meth)acrylate such as 2-hydroxyethyl (meth)acrylate or 2-hydroxybutyl (meth)acrylate; a (meth)acrylamide such as (meth)acrylamide, N,N-dimethyl (meth)acrylamide or N,N-diethyl (meth)acrylamide; styrene; an alkylstyrene such as o-methylstyrene, m-methylstyrene, p-methylstyrene, o-ethylstyrene, m-ethylstyrene, p-ethylstyrene, o-octylstyrene, m-octylstyrene or p-octylstyrene; a fluoroalkylstyrene such as o-trifluoromethylstyrene, m-trifluoromethylstyrene or p-trifluoromethylstyrene; a silicon-containing styrene such as o-trimethylsilylstyrene, m-trimethylsilylstyrene, p-trimethylsilylstyrene, o-tris(trimethylsiloxy)silylstyrene, m-tris(trimethylsiloxy)

silylstyrene, or p-tris(trimethylsiloxy)silylstyrene; vinyl acetate; (meth)acrylonitrile; (meth)acrylic acid; α-methylstyrene; and N-vinylpyrrolidone. These monomers may be used alone or in combination as a mixture of two or more of them.

In this specification, "(meth)acryl . . . " means "acryl . . . " and/or "methacryl . . . ".

To improve the mechanical strength or durability of the shaped product, it is preferred to employ a crosslinkable monomer which is a polyfunctional polymerizable compound having at least two copolymerizable unsaturated double bonds in one molecule. Such a crosslinkable monomer may, for example, be ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl acrylate, 3-acryloyloxy-2-hydroxypropyl methacrylate, 3-acryloyloxypropyl methacrylate, butanediol (meth)acrylate, divinylbenzene, diallyl phthalate, diallyl adipate, 2,2-bis(4-(meth)acryloyloxyethoxyphenyl)propane, 2,2-bis(4-(meth)acryloyloxypolyethoxyphenyl)propane, 2,2-bis[(4-(3-(meth)acryloyloxy-2-hydroxypropoxy)-phenyl]propane, di((meth)acryloyloxyethyl) trimethylhexamethylene diurethane, triallyl isocyanurate, α-methylene-N-vinylpyrrolidone, 4-allylbenzyl (meth)acrylate, 4-vinylbenzyl (meth)acrylate, 3-vinylbenzyl (meth)acrylate, 2,2-bis(p-(meth)acryloyloxyphenyl) hexafluoropropane, 2,2-bis(m-(meth)acryloyloxyphenyl) hexafluoropropane, 2,2-bis(o-(meth)acryloyloxyphenyl) hexafluoropropane, 2,2-bis(p-(meth)acryloyloxyphenyl) propane, 2,2-bis(m-(meth)acryloyloxyphenyl)propane, 2,2-bis(o-(meth)acryloyloxyphenyl)propane, 1,4-bis(2-(meth) acryloyloxyhexafluoroisopropyl)benzene, 1,3-bis(2-(meth) acryloyloxyhexafluoroisopropyl)benzene, 1,2-bis(2-(meth) acryloyloxyhexafluoroisopropyl)benzene, 1,4-bis(2-(meth) acryloyloxy isopropyl)benzene, 1,3-bis(2-(meth) acryloyloxyisopropyl)benzene or 1,2-bis(2-(meth) acryloyloxyisopropyl)benzene. These crosslinkable monomers may be used alone or in combination as a mixture of two or more of them.

The amount of the crosslinkable monomer may usually be suitably adjusted depending upon the type of the shaped product.

In the present invention, the fluidity of the half polymer having a rate of polymerization of from 5 to 90 wt %, is influential over the operation efficiency for filling the half polymer in a predetermined cavity such as in a mold. Accordingly, in the present invention, it is preferred to adjust the amount of the crosslinkable monomer within a range not to adversely affect the fluidity of the half polymer.

The amount of the crosslinkable monomer can not generally be defined, since the fluidity of the half polymer differs depending upon the type of the monomer used or upon the rate of polymerization of the half polymer. Usually, however, it is preferably at least 0.01 wt % based on the total amount of the monomer used, in order to sufficiently obtain the crosslinking effect and at most 5 wt % to avoid deterioration of the fluidity.

Now, some examples for using the above monomers depending upon the types and uses of shaped products will be described.

For example, in a case where an optical lens such as an intraocular lens, a camera lens or a lens for spectacles is to be prepared, it is preferred to use a monomer comprising methyl methacrylate as the main component. In a case where a plastic optical fiber is to be prepared, it is preferred to use a monomer comprising methyl methacrylate as the main component for the core portion and a monomer comprising a fluoroalkyl methacrylate as the main component for the shell portion. Further, for example, in a case where a contact lens having a high oxygen permeability is to be prepared, it is preferred to use methyl methacrylate and a silicon-containing methacrylate such as trimethylsilylpropyl methacrylate or tris(trimethylsiloxy)silylpropyl methacrylate, or a fluorine-containing (meth)acrylate such as 2,2,2-trifluoroethyl (meth)acrylate or 2,2,2,2',2',2'-hexafluoroisopropyl (meth)acrylate, in combination.

Further, for example, in a case where the product is used as a filling resin for dental use, it is preferred to use a methacrylate such as methyl methacrylate.

The polymerization behavior of the mixture comprising the above iniferter and the radical polymerizable monomer, is like living polymerization, and the molecular weight of the resulting polymer is influenced by the amount of the iniferter.

In general, if the amount of the iniferter is small, the molecular weight of the resulting polymer becomes high, whereby the viscosity of the half polymer tends to be high, which in turn adversely affects the operation efficiency in filling the half polymer in a predetermined cavity such as in a mold. Further, if the amount of the iniferter is small, the time required for polymerization tends to be long. From these viewpoints, the amount of the iniferter is usually at least 0.005 part by weight, preferably at least 0.01 part by weight, per 100 parts by weight of the radical polymerizable monomer.

On the other hand, if the amount of the iniferter is too large, the molecular weight of the resulting polymer tends to be low, and the mechanical strength tends to be low. Accordingly, the amount of the iniferter is usually at most 10 parts by weight, preferably at most 5 parts by weight, per 100 parts by weight of the radical polymerizable monomer.

If necessary, an additive such as a dye, a pigment, a filler or an antioxidant, may be added to the mixture containing the iniferter and the radical polymerizable monomer within a range not to impair the purpose of the present invention. When such additives are to be employed, it is preferred to mix them so that the additives are uniformly dispersed or dissolved in the mixture comprising the iniferter and the radical polymerizable monomer. Further, if necessary, a solvent or the like may be added to the mixture comprising the iniferter and the radical polymerizable monomer.

As such a solvent, it is preferred to employ a solvent which is capable of dissolving the radical polymerizable monomer, the iniferter and the additives as well as the resulting polymer and which does not hinder the polymerization of the above monomer and does not show a characteristic absorption in the wavelength region of light rays for polymerization when polymerization is carried out by light. As a solvent having such a nature, toluene, xylene, ethylbenzene, acetone, methyl ethyl ketone, ethyl acetate, dimethylformamide, isopropyl alcohol, hexane or heptane may, for example, be mentioned.

A half polymer having a rate of polymerization of from 5 to 90 wt % is prepared by polymerizing a mixture comprising the iniferter and the radical polymerizable monomer or, if necessary, a solution of a mixture comprising the iniferter and the radical polymerizable monomer dissolved in the above-described solvent.

As a method for polymerizing the mixture, a method of irradiating light rays for polymerization or a method of heating for polymerization may, for example, be mentioned.

The polymerization energy to be used for polymerizing the mixture may, for example, be an electromagnetic radiation energy such as light rays or a heat energy formed by e.g. heating. These energies may be used alone or in combination.

Ultraviolet rays may be mentioned as typical light rays (electromagnetic radiation) to be used for the above method of irradiating light rays for polymerization. The intensity and the wavelength of such ultraviolet rays can not be generally defined, since they vary depending upon the types of the iniferter and the monomer used, etc. Usually, the wavelength of such ultraviolet rays is preferably at least 250 nm to avoid decomposition of the monomer by excitation. On the other hand, if the wavelength of ultraviolet rays becomes long, it tends to be close to the wavelength of visible light rays whereby it will be necessary to be careful about shielding of visible light, and the operation tends to be somewhat cumbersome. Accordingly, the wavelength of the ultraviolet rays is preferably at most 450 nm.

In a case where polymerization of the monomer is carried out by irradiating light rays, it is possible to conduct the polymerization by putting the monomer in a light ray-permeable container and irradiating light rays to the monomer from the exterior of the container. The temperature at that time may be room temperature or higher or lower than room temperature. From the viewpoint of the operation efficiency, the temperature is preferably room temperature.

On the other hand, in a case where the polymerization is carried out by heating, the heating temperature is usually from 10° to 250° C., preferably from 50° to 130° C.

In the case where the polymerization is carried out by irradiating light rays, the polymerization time varies due to a delicate difference in the distance from the light source, the type of the container used or the amount of the monomer, even if the same monomer and the same iniferter are employed. Therefore, the polymerization time can not generally be defined, and it is preferably appropriately adjusted depending upon varios polymerization conditions.

As mentioned above, the present invention is characterized in that an iniferter is used, whereby the progress and termination of polymerization of the monomer by the above iniferter can be controlled by adjusting the irradiation and termination of light rays or by adjusting the heating.

Accordingly, a half polymer having a predetermined rate of polymerization can be prepared by polymerizing the mixture comprising the iniferter and the radical polymerizable monomer in such a manner that when polymerization of the monomer has progressed to the predetermined rate of polymerization, radiation of light ray or heating is stopped for light shielding or cooling.

Here, the rate of polymerization in this specification is represented by the weight percentage obtained by dividing the amount (by weight) of the monomer before initiation of the polymerization by the amount (by weight) of the polymerized monomer, as represented by the formula:

Rate of polymerization (wt %) =

$$\frac{\text{Amount of polarized monomer (weight)}}{\text{Amount of monomer before polymerization (weight)}} \times 100$$

To reduce polymerization shrinkage during the preparation of a polymer from the half polymer, the rate of polymerization of the half polymer obtainable by polymerizing the mixture comprising the iniferter and the radical polymerizable monomer is adjusted to be at least 5 wt %, preferably at least 10 wt %, more preferably at least 20 wt %. On the other hand, to avoid a possibility that the viscosity of the half polymer tends to be so high that the operation efficiency for filling the half polymer in a prescribed cavity tends to deteriorate, the rate of polymerization is usually at most 90 wt %, preferably at most 80 wt %.

In order to stop the polymerization when it has reached to the desired rate of polymerization, it is preferred to preliminarily grasp the relation between the rate of polymerization and the irradiation time of light rays or the heating time.

The half polymer thus obtained may be immediately used for the subsequent step or may be stored so that it can be used when required.

With the above half polymer, when an iniferter capable of functioning with light is used, polymerization does not proceed under a condition where light rays are shielded. Likewise, when an iniferter capable of functioning with heat is used, polymerization does not proceed at a temperature lower than the threshold temperature for polymerization. Therefore, the half polymer can be stored in that state. Accordingly, when the above half polymer is to be stored, it is necessary to shield light so that light rays will not be irradiated to the half polymer, or to keep it at a temperature lower than the threshold temperature, preferably under a low temperature condition.

Among the above-mentioned iniferters, there may be one which undergoes decomposition to polymerize the residual monomer during the storage of the half polymer. Accordingly, the temperature during the storage of the half polymer obtained by using such an iniferter should preferably not be so high. From such a viewpoint, when the above half polymer is stored, it is generally preferred to store it at a temperature not higher than room temperature.

The feature that the half polymer can be maintained as described above, brings about a wide range of merits. For example, the manufacturers are able to keep the half polymer in stock after its preparation until its use for the preparation of a shaped product.

Then, the half polymer is again irradiated with light rays or heated to complete its polymerization.

Heretofore, to prepare a shaped product from the half polymer, it has been required to add a polymerization initiator or the like afresh in order to resume the polymerization. However, if a polymerization initiator is added to such a half polymer, it is difficult to uniformly disperse such a polymerization initiator in the half polymer, and as mentioned above, such a method can not be used by a user who has no equipment required to mix such a polymerization initiator.

Whereas, with the half polymer used in the present invention, polymerization can be resumed simply by irradiating light rays or by heating without adding a polymerization initiator afresh, whereby a shaped product having a uniform composition can be simply and economically prepared.

By filling the above half polymer in a predetermined cavity such as a mold and completing the polymerization, it is possible to obtain a molded product having excellent transferability of the mold or a cured filling material free from voids.

In a case where the above molded product is a lens for spectacles or an ocular lens such as a contact lens, the above half polymer is filled in a cavity of a mold having the predetermined lens shape, followed by irradiation with light rays or heating to complete the polymerization to prepare a lens having the predetermined shape.

It is thereby possible to obtain a shaped product having a highly accurate predetermined shape, since it is polymerized to a predetermined rate of polymerization already at the stage of preparation of the half polymer, and polymerization shrinkage at the stage of preparation of the shaped product from the half polymer is very small.

Now, the process for producing a shaped product of the present invention will be described in further detail with reference to Examples. However, it should be understood that the present invention is by no means restricted to such specific Examples.

EXAMPLE 1

To 100 parts by weight of methyl methacrylate as a monomer, 0.3 part by weight of N,N,N',N'-tetraethylthiuram disulfide as an iniferter was mixed to obtain a mixture having a uniform composition. 320 g of the obtained mixture was poured into a 1 l flask, and then light rays (ultraviolet rays) were irradiated from a distance of 15 cm by a black light (National Black Light Blue FL10BF-B, manufactured by Matsushita Electric Industrial Co., Ltd.) to attain a half polymerized state. As a result, viscosity increase was observed, and a half polymer was obtained.

Then, the rate of polymerization and the molecular weight of the obtained half polymer were measured by means of a gel permeation chromatograph provided with an ultraviolet absorbance detector and a differential refractometer. As a result, the rate of polymerization was about 35 wt %, and the number average molecular weight was about 71,000.

Further, the above half polymer was stored under a light-shielding condition for about 2 weeks at room temperature, and then similar analyses were carried out, whereby no change was observed in the rate of polymerization and the number average molecular weight, and no progress in polymerization during this period was observed. Thus, the half polymer was confirmed to be excellent in the stability during storage.

Then, the obtained half polymer was filled in a glass mold (shape of the cavity: diameter 13 mm, inner height 4.5 mm) designed to obtain a plano-convex lens and again irradiated with light rays from a distance of 15 cm by the above-mentioned black light, whereupon polymerization was resumed and completed to obtain a molded product.

The polymerization shrinkage of the obtained molded product was calculated by the following formula and found to be 13.5%.

$$\text{Polymerization shrinkage (\%)} = \frac{\text{Filled monomer volume} - \text{Volume of molded product after curing}}{\text{Filled monomer volume}} \times 100$$

COMPARATIVE EXAMPLE 1

Examination of stability of the half polymerized state by means of a conventional polymerization initiator To 100 parts by weight of methyl methacrylate as a monomer, 0.3 part by weight of 1-(4-isopropylphenyl)-2-hydroxy-2-methylpropan-1-one (Darocure 1116, tradename, manufactured by Ciba Geigy) as a photopolymerization initiator, was mixed to obtain a mixture having a uniform composition. The obtained mixture was irradiated with light rays by the above-mentioned black light in the same manner as in Example 1 to a half polymerized state. Then, this half polymer was stored under a light shielding condition for 2 weeks at room temperature, whereby polymerization proceeded and the half polymer was cured, so that it was not possible to proceed to the next step.

COMPARATIVE EXAMPLE 2

Examination of polymerization shrinkage when the polymerization was carried out from the monomer stage To 100 parts by weight of methyl methacrylate as a monomer, 0.3 part by weight of 1-(4-isopropylphenyl)-2-hydroxy-2-methylpropan-1-one (Darocure 1116, tradename, manufactured by Ciba Geigy) as a photopolymerization initiator, was mixed to obtain a mixture having a uniform composition. The obtained mixture was filled in a glass mold having the same shape as shown in Example 1 and irradiated with light rays by the above-mentioned black light from a distance of 15 cm to complete the polymerization and to obtain a molded product. The polymerization shrinkage at that time was about 21%, which was twice as high as compared with Example 1.

From the results of Example 1 and Comparative Examples 1 and 2, it is evident that when a process which comprises preparing a half polymer by using an iniferter and then preparing a shaped product, is used as in Example 1, the half polymer is excellent in storage stability in a half polymerized state, and polymerization can be resumed and completed by such a simple operation as irradiating light in that state, whereby it is possible to obtain a shaped product having a small polymerization shrinkage.

EXAMPLE 2

To 100 parts by weight of butyl acrylate as a monomer, 1 part by weight of benzyl-N,N-diethyldithiocarbamate and 0.1 part by weight of N,N,N',N'-tetraethylthiuram disulfide as iniferters were mixed to obtain a mixture having a uniform composition. 50 g of the obtained mixture was poured into a sample bottle and irradiated with light rays by the above-mentioned black light from a distance of 15 cm to a half polymerized state. As a result, viscosity increase was observed, and a half polymer was obtained.

Then, the rate of polymerization and the molecular weight of the obtained half polymer were measured in the same manner as in Example 1. As a result, the rate of polymerization was about 60 wt %, and the number average molecular weight was about 26,000.

Further, the above half polymer was stored under a light-shielding condition for 5 days at room temperature and then analyses were carried out in the same manner, whereby no change was observed in the rate of polymerization and the number average molecular weight, and no progress in polymerization during this period was observed. Thus, the half polymer was confirmed to be excellent in stability during the storage.

EXAMPLE 3

To 100 parts by weight of butyl acrylate as a monomer, 1 part by weight of benzyl-N,N-diethyldithiocarbamate and 0.1 part by weight of N,N,N',N'-tetraethylthiuram disulfide as iniferters were mixed to obtain a mixture having a uniform composition. 30 g of the obtained mixture was poured into a sample bottle and then while stirring by a magnetic stirrer, it was irradiated with light rays by the above-mentioned black light from a distance of 15 cm to a half polymerized state. As a result, viscosity increase was observed, and a half polymer was obtained. The rate of polymerization of the obtained half polymer was measured in the same manner as in Example 1 and found to be about 33 wt %.

Then, the obtained half polymer was filled in a glass test tube, and while rotating the test tube in a constant temperature water tank at 30° C., it was again irradiated with light rays by the above-mentioned black light from a distance of 15 cm, whereupon polymerization was resumed and completed to obtain a polymer. The polymerization shrinkage of the obtained polymer was c alc ulat ed by the following formula and found to be 10.7%.

Polymerization shrinkage (%) =

$$\frac{\text{Filled monomer volume} - \text{Volume of molded product after curing}}{\text{Filled monomer volume}} \times 100$$

COMPARATIVE EXAMPLE 3

Examination of polymerization shrinkage when Polymerization was carried out from the monomer stage To 100 parts by weight of butyl acrylate as a monomer, 1 part by weight of benzyl-N,N-diethyldithiocarbamate and 0.1 part by weight of N,N,N',N'-tetraethylthiuram disulfide as iniferters were mixed to obtain a mixture having a uniform composition. The obtained mixture was filled into a glass test tube, and while rotating the test tube in a constant temperature water tank at 30° C., light rays were irradiated by the above-mentioned black light from a distance of 15 cm to complete the polymerization to obtain a polymer. The polymerization shrinkage at that time was 14.2%, which was large as compared with Example 3.

From the result of Examples 2 and 3 and Comparative Example 3, it is evident that when a process which comprises preparing a half polymer by using an iniferter and then preparing a polymer, is employed as in Examples 2 and 3, the half polymer is excellent in the storage stability in the half polymerized state, and polymerization can be resumed and completed by such a simple operation as irradiating light in such a state, and it is possible to prepare a polymer having a small polymerization shrinkage.

EXAMPLE 4

To 100 parts by weight of methyl methacrylate as a monomer, 0.18 part by weight of 1,2,4,5-tetrakis(N,N-diethyldithiocarbamylmethyl)benzene as an iniferter was mixed to obtain a mixture having a uniform composition. 50 g of the obtained mixture was poured into a sample bottle and then irradiated with light rays by the above-mentioned black light from a distance of 15 cm to a half polymerized state. As a result, viscosity increase was observed, and a half polymer was obtained.

Then, the molecular weight of the obtained half polymer was measured in the same manner as in Example 1, whereby the number average molecular weight was about 78,000. Further, the rate of polymerization of this half polymer was calculated by a measurement of nuclear magnetic resonance spectrum (hereinafter referred to as NMR measurement) and found to be 24 wt %.

Further, the above half polymer was stored under a light-shielding condition for 5 days at room temperature, and then analyses were carried out in the same manner as in Example 1, whereby no change was observed in the rate of polymerization and the number average molecular weight, and no progress in polymerization during this period was observed. Thus, the half polymer was found to be excellent in stability during the storage.

EXAMPLE 5

To 100 parts by weight of styrene as a monomer, 0.38 part by weight of 1,2,4,5-tetrakis(N,N-diethyldithiocarbamylmethyl)benzene as an iniferter was mixed to obtain a mixture having a uniform composition. 60 g of the obtained mixture was poured into a sample bottle and irradiated with light rays by the above-mentioned black light from a distance of 15 cm to a half polymerized state. As a result, viscosity increase was observed, and a half polymer was obtained.

Then, the rate of polymerization of the obtained half polymer was calculated by NMR measurement and found to be about 36 wt %.

Further, the half polymer was stored under a light-shielding condition for 5 days at room temperature and then analyses were carried out in the same manner, whereby no change was observed in the rate of polymerization, and no progress in polymerization during this period was observed. Thus, the half polymer was found to be excellent in stability during the storage.

Then, the obtained half polymer was filled in a glass test tube, and while rotating the test tube in a constant temperature water tank at 30° C., light rays were irradiated by the above-mentioned black light from a distance of 15 cm, whereby the polymerization was resumed and completed to obtain a polymer.

The polymerization shrinkage of the obtained polymer was determined in the same manner as in Example 3 and found to be 8.61%.

COMPARATIVE EXAMPLE 4

Examination of polymerization shrinkage when polymerization was carried out from the monomer stage To 100 parts by weight of styrene as a monomer, 0.38 part by weight of 1,2,4,5-tetrakis(N,N-diethyldithiocarbamylmethyl)benzene as an iniferter was mixed to obtain a mixture having a uniform composition. The obtained mixture was filled in a glass test tube, and while rotating the test tube in a constant temperature water tank at 30° C., light rays were irradiated by the above-mentioned black light from a distance of 15 cm, and the polymerization was completed to obtain a polymer. The polymerization shrinkage at that time was 15.0% which was large as compared with Example 5.

From the results of Examples 4 and 5 and Comparative Example 4, it is evident that when a process which comprises preparing a half polymer by using an iniferter and then preparing a polymer, is employed as in Examples 4 and 5, the half polymer is excellent in the storage stability in the half polymerized state, and polymerization can be resumed and completed by such a simple operation as irradiating light in such a state, and it is possible to obtain a polymer having a small polymerization shrinkage.

EXAMPLE 6

To 100 parts by weight of styrene as a monomer, 0.69 part by weight of 1,2,4,5-tetrakis(N,N-diethyldithiocarbamylmethyl)benzene and 0.026 part by weight of N,N,N',N'-tetraethylthiuram disulfide as iniferters were mixed to obtain a mixture having a uniform composition. 30 g of the obtained mixture was poured into a sample bottle and then irradiated with light rays by the above-mentioned black light from a distance of 15 cm to a half polymerized state. As a result, viscosity increase was observed, and a half polymer was obtained.

Then, the rate of polymerization of the obtained half polymer was calculated by NMR measurement and found to be about 36 wt %.

Further, the above half polymer was stored under a light-shielding condition for 6 days at room temperature, and then analysis was carried out in the same manner, whereby no change was observed in the rate of polymerization, and no progress in polymerization during this period was observed. Thus, the half polymer was found to be excellent in stability during the storage.

EXAMPLE 7

To 49 parts by weight of methyl methacrylate and 51 parts by weight of styrene as monomers, 0.58 part by weight of N,N,N',N'-tetraethylthiuram disulfide as an iniferter was mixed to obtain a mixture having a uniform composition. 20 g of the obtained mixture was poured into a sample bottle and then irradiated with light rays by the above-mentioned black light from a distance of 15 cm. As a result, viscosity increase was observed, and a half polymer was obtained.

Then, the molecular weight of the obtained half polymer was measured in the same manner as in Example 1, whereby the number average molecular weight was about 21,600. Further, the rate of polymerization of this half polymer was calculated by NMR measurement, whereby it was about 31 wt % with respect to methyl methacrylate, about 40 wt % with respect to styrene, and about 36 wt % as the entire monomers.

Further, the above half polymer was stored under a light-shielding condition for 7 days at room temperature, and then analysis was carried out in the same manner, whereby no change was observed in the rate of polymerization and the number average molecular weight, and no progress in polymerization during this period was observed. Thus, the half polymer was found to be excellent in stability during the storage.

EXAMPLE 8

To 44 parts by weight of methyl methacrylate and 56 parts by weight of butyl acrylate as monomers, 0.52 part by weight of-N,N,N',N'-tetraethylthiuram disulfide as an iniferter was mixed to obtain a mixture having a uniform composition. 20 g of the obtained mixture was poured into a sample bottle and irradiated with light rays by the above-mentioned black light from a distance of 15 cm to a half polymerized state. As a result, viscosity increase was observed, and a half polymer was obtained.

Then, the molecular weight of the obtained half polymer was measured in the same manner as in Example 1, whereby the number average molecular weight was about 40,000. Further, the rate of polymerization of this half polymer was calculated by NMR measurement, whereby it was about 24 wt % with respect to methyl methacrylate, about 11 wt % with respect to butyl acrylate, and about 17 wt % as the entire monomers.

Further, the above half polymer was stored under a light-shielding condition for 7 days at room temperature, and then analyses were carried out in the same manner, whereby no change was observed in the rate of polymerization and the number average molecular weight, and no progress in polymerization during this period was observed. Thus, the half polymer was found to be excellent in stability during the storage.

EXAMPLE 9

To 45 parts by weight of styrene and 55 parts by weight of butyl acrylate as monomers, 0.51 part by weight of N,N,N',N'-tetraethylthiuram disulfide as an iniferter was mixed to obtain a mixture having a uniform composition. 20 g of the obtained mixture was poured into a sample bottle and irradiated with light rays by the above-mentioned black light from a distance of 15 cm to attain a half polymerized state. As a result, viscosity increase was observed, and a half polymer was obtained.

Then, the molecular weight of the obtained half polymer was measured in the same manner as in Example 1, whereby the number average molecular weight was found to be about 35,900. Further, the rate of polymerization of this half polymer was calculated by NMR measurement, whereby it was about 77 wt % with respect to styrene, about 57 wt % with respect to butyl acrylate, and about 66 wt % as the entire monomers.

Further, the above half polymer was stored under a light-shielding condition for 7 days at room temperature, and then analyses were carried out in the same manner, whereby no change was observed in the rate of polymerization and the number average molecular weight, and no progress in polymerization during this period was observed. Thus, the half polymer was found to be excellent in stability during the storage.

From the results of Examples 6 to 9, it is evident that when a process which comprises preparing a half polymer by using an iniferter and then preparing a polymer, is employed, the half polymer is excellent in the storage stability in a half polymerized state, and polymerization can be resumed and completed by such a simple operation and irradiating light in such a state.

EXAMPLE 10

To 49 parts by weight of methyl methacrylate and 51 parts by weight of styrene as monomers, 0.65 part by weight of ethylene glycol dimethacrylate as a crosslinking agent and 0.58 part by weight of N,N,N',N'-tetraethylthiuram disulfide as an iniferter were mixed to obtain a mixture having a uniform composition. 5 g of the obtained mixture was poured into a sample bottle and then irradiated with light rays by the above-mentioned black light from a distance of 15 cm to attain a half polymerized state. As a result, viscosity increase was observed, and a half polymer was obtained.

Then, the rate of polymerization of the obtained half polymer was calculated by NMR measurement, whereby a plurality of half polymers having different rates of polymerization were obtained due to the difference in the irradiation time of light rays, and the rate of polymerization was from 20 to 46 wt % with respect to methyl methacrylate, from 27 to 50 wt % with respect to styrene, and from about 24 to 28 wt % as the entire monomers.

Further, the viscosities (25° C.) of the half polymers having different rates of polymerization were measured by an E type viscometer, whereby the viscosity was 1,370 mPa·s when the rate of polymerization with respect to methyl methacrylate was 42 wt % and the rate of polymerization with respect to styrene was 33 wt %. Thus, it was confirmed that even when a crosslinking agent was added, a half polymer having good fluidity was obtained.

EXAMPLE 11

To 49 parts by weight of methyl methacrylate and 51 parts by weight of styrene as monomers, 0.42 part by weight of divinylbenzene as a crosslinking agent and 0.58 part by weight of N,N,N',N'-tetraethylthiuram disulfide as an iniferter were mixed to obtain a mixture having a uniform composition. 5 g of the obtained mixture was poured into a sample bottle and then irradiated with light rays by the above-mentioned black light from a distance of 15 cm. As a result, viscosity increase was observed, and a half polymer was obtained.

Then, the rate of polymerization of the obtained half polymer was calculated by NMR measurement, whereby a plurality of half polymers having different rates of polymerization were obtained due to the difference in the irradiation time of light rays, and the rate of polymerization was from 16 to 33 wt % with respect to methyl methacrylate, from 24 to 40 wt % with respect to styrene, and from about 20 to 37 wt % as the entire monomers.

Further, the viscosities (25° C.) of the half polymers having different rates of polymerization were measured by an E type viscometer, whereby the viscosity was 805 mPa·s when the rate of polymerization with respect to methyl methacrylate was 40 wt %, and the rate of polymerization with respect to styrene was 33 wt %. Thus, it was confirmed that even when a crosslinking agent was added, a half polymer having good fluidity was obtained.

EXAMPLE 12

To 49 parts by weight of methyl methacrylate and 51 parts by weight of styrene as monomers, 0.66 part by weight of vinylbenzyl methacrylate as a crosslinking agent and 0.58 part by weight of N,N,N',N'-tetraethylthiuram disulfide as an iniferter were mixed to obtain a mixture having a uniform composition. 5 g of the obtained mixture was poured into a sample bottle and then irradiated with light rays by the above-mentioned black light from a distance of 15 cm to attain a half polymerized state. As a result, viscosity increase was observed, and a half polymer was obtained.

Then, the rate of polymerization of the obtained half polymer was calculated by NMR measurement, whereby a plurality of half polymers having different rates of polymerization were obtained due to the difference in the irradiation time of light rays, and the rate of polymerization was from 19 to 34 wt % with respect to methyl methacrylate, from 30 to 44 wt % with respect to styrene, and from about 25 to 39 wt % as the entire monomers.

Futther, the viscosities (25° C.) of the half polymers having different rates of polymerization were measured by an E type viscometer, whereby the viscosity was 834 mPa·s when the rate of polymerization with respect to methyl methacrylate was 44 wt %, and the rate of polymerization with respect to styrene was 34 wt %. Thus, it was confirmed that even when a crosslinking agent was added, a half polymer having good fluidity was obtained.

EXAMPLE 13

To 44 parts by weight of methyl methacrylate and 56 parts by weight of butyl acrylate as monomers, 0.49 part by weight of ethylene glycol diacrylate as a crosslinking agent and 0.52 part by weight of N,N,N',N'-tetraethylthiuram disulfide as an iniferter were mixed to obtain a mixture having a uniform composition. 5 g of the obtained mixture was poured into a sample bottle and then irradiated with light rays by the above-mentioned black light from a distance of 15 cm to attain a half polymerized state. As a result, viscosity increase was observed, and a half polymer was obtained.

Then, the rate of polymerization of the obtained half polymer was calculated by NMR measurement, whereby a plurality of half polymers having different rates of polymerization were obtained due to the difference in the irradiation time of light rays, and the rate of polymerization was from 24 to 58 wt % with respect to methyl methacrylate, from 10 to 29 wt % with respect to butyl acrylate, and from about 16 to 42 wt % as the entire monomers.

Further, the viscosities (25° C.) of the half polymers having different rates of polymerization were measured by an E type viscometer, whereby the viscosity was 9,070 mPa·s when the rate of polymerization with respect to methyl methacrylate was 48 wt %, and the rate of polymerization of butyl acrylate was 22 wt %. Thus, it was confirmed that even when a crosslinking agent was added, a half polymer having good fluidity was obtained.

EXAMPLE 14

To 44 parts by weight of methyl methacrylate and 56 parts by weight of butyl acrylate as monomers, 0.63 part by weight of glycerol methacrylate acrylate as a crosslinking agent and 0.52 part by weight of N,N,N',N'-tetraethylthiuram disulfide as an iniferter were mixed to obtain a mixture having a uniform composition. 5 g of the obtained mixture was poured into a sample bottle and then irradiated with light rays by the above-mentioned black light from a distance of 15 cm. As a result, viscosity increase was observed, and a half polymer was obtained.

Then, the rate of polymerization of the obtained half polymer was calculated by NMR measurement, whereby a plurality of half polymers having different rates of polymerization were obtained due to the difference in the irradiation time of light rays, and the rate of polymerization was from 12 to 51 wt % with respect to methyl methacrylate, from 5.6 to 25 wt % with respect to butyl acrylate, and from about 8 to 36 wt % as the entire monomers.

Further, the viscosities (25° C.) of the half polymers having different rates of polymerization were measured by an E type viscometer, whereby the viscosity was 12,300 mPa·s when the rate of polymerization with respect to methyl methacrylate was 51 wt %, and the rate of polymerization with respect to butyl acrylate was 25 wt %. Thus, it was confirmed that even when a crosslinking agent was added, a half polymer having good fluidity was obtained.

EXAMPLE 15

To 45 parts by weight of styrene and 55 parts by weight of butyl acrylate as monomers, 0.49 part by weight of ethylene diacrylate as a crosslinking agent and 0.51 part by weight of N,N,N',N'-tetraethylthiuram disulfide as an iniferter were mixed to obtain a mixture having a uniform composition. 5 g of the obtained mixture was poured into a sample bottle and then irradiated with light rays by the above-mentioned black light from a distance of 15 cm. As a result, viscosity increase was observed, and a half polymer was obtained.

Then, the rate of polymerization of the obtained half polymer was calculated by NMR measurement, whereby a plurality of half polymers having different rates of polymerization were obtained due to the difference in the irradiation time of light rays, and the rate of polymerization was from 44 to 63 wt % with respect to styrene, from 28 to 43 wt % with respect to butyl acrylate, and from about 35 to 52 wt % as the entire monomers.

Further, the viscosities (25° C.) of the half polymers having different rates of polymerization were measured by an E type viscometer, whereby the viscosity was 1,570 mPa·s when the rate of polymerization with respect to styrene was 63 wt %, and the rate of polymerization with respect to butyl acrylate was 43 wt %. Thus, it was confirmed that even when a crosslinking agent was added, a half polymer having good fluidity was obtained.

EXAMPLE 16

To 45 parts by weight of styrene and 55 parts by weight of butyl acrylate as monomers, 0.37 part by weight of divinylbenzene as a crosslinking agent and 0.51 part by weight of N,N,N',N'-tetraethylthiuram disulfide as an inifer-ter were mixed to obtain a mixture having a uniform composition. 5 g of the obtained mixture was poured into a sample bottle and then irradiated with light rays by the above-mentioned black light from a distance of 15 cm. As a result, viscosity increase was observed, and a half polymer was obtained.

Then, the rate of polymerization of the obtained half polymer was calculated by NMR measurement, whereby a plurality of half polymers having different rates of polymerization were obtained due to the difference in the irradiation time of light rays, and the rate of polymerization was from 35 to 61 wt % with respect to styrene, from 15 to 40 wt % with respect to butyl acrylate, and from about 24 to 49 wt % as the entire monomers.

Further, the viscosities (25° C.) of the half polymers having different rates of polymerization were measured by an E type viscometer, whereby the viscosity was 37,600 mPa·s when the rate of polymerization with respect to styrene was 61 wt %, and the rate of polymerization with respect to butyl acrylate was 40 wt %. Thus, it was confirmed that even when a crosslinking agent was added, a half polymer having good fluidity was obtained.

From the results of Examples 10 to 16, it is evident that when the process which comprises firstly preparing a half polymer by using an iniferter, is employed, it is possible to prepare half polymers having different rates of polymerization in correspondence with the irradiation time of light, and in spite of the fact that a crosslinking agent is used, such half polymers have good fluidity.

EXAMPLE 17

To 100 parts by weight of butyl methacrylate as a monomer, 0.43 part by weight of N,N,N',N'-tetraethylthiuram disulfide as an iniferter was mixed to obtain a mixture having a uniform composition. 12 g of the obtained mixture was poured into a vial, sealed and then left to stand in an oil bath at about 100° C., whereby it became a half polymerized state. As a result, viscosity increase was observed, and a half polymer was obtained.

Then, the rate of polymerization and the molecular weight of the obtained half polymer were measured in the same manner as in Example 1. As a result, the rate of polymerization was about 42 wt %, and the number average molecular weight was about 54,300.

Further, the above half polymer was stored under a light-shielding condition for 14 days in a refrigerator (about 5° C.), whereupon analysis was carried out in the same manner, whereby no change was observed in the rate of polymerization and the number average molecular weight, and no progress in polymerization during this period was observed. Thus, it was confirmed that the half polymer was excellent in stability during the storage.

From the results of Example 17, it is evident that when a process which comprises firstly preparing a half polymer by using an iniferter, is employed, the half polymer is excellent in the storage stability in the half polymerized state.

EXAMPLE 18

To 100 parts by weight of butyl acrylate as a monomer, 0.49 part by weight of ethylene diacrylate as a crosslinking agent and 0.51 part by weight of N,N,N',N'-tetraethylthiuram disulfide as an iniferter were mixed to obtain a mixture having a uniform composition. 5 g of the obtained mixture was poured into a vial, sealed and then left to stand in an oil bath at about 100° C., whereby it became a half polymerized state. As a result, viscosity increase was observed, and a half polymer was obtained.

Then, the rate of polymerization of the obtained half polymer was calculated by NMR measurement, whereby a plurality of half polymers having different rates of polymerization were obtained due to the difference in the heating time, and the rate of polymerization was from 30 to 41 wt %.

Further, the viscosities (25° C.) of the half polymers having different rates of polymerization were measured by an E type viscometer, whereby the viscosity was 2,790 mPa·s when the rate of polymerization was 41 wt %. Thus, it was confirmed that even when a crosslinking agent was added, a half polymer having good fluidity was obtained.

EXAMPLE 19

To 100 parts by weight of butyl acrylate as a monomer, 0.57 part by weight of ethylene dimethacrylate as a crosslinking agent and 0.51 part by weight of N,N,N',N'-tetraethylthiuram disulfide as an iniferter were mixed to obtain a mixture having a uniform composition. 5 g of the obtained mixture was poured into a vial, sealed and then left to stand in an oil bath at about 100° C., whereby it became a half polymerized state. As a result, viscosity increase was observed, and a half polymer was obtained.

Then, the rate of polymerization of the obtained half polymer was calculated by NMR measurement, whereby a plurality of half polymers having different rates of polymerization were obtained due to the difference in the heating time, and the rate of polymerization was from 31 to 38 wt %.

Further, the viscosities (25° C.) of the half polymers having different rates of polymerization were measured by an E type viscometer, whereby the viscosity was 721 mPa·s when the rate of polymerization was 35 wt %. Thus, it was confirmed that even if a crosslinking agent was added, a half polymer having good fluidity was obtained.

From the results of Examples 18 to 19, it is evident that when a process which comprises firstly preparing a half polymer by using an iniferter, is employed, it is possible to prepare half polymers having different rates of polymerization in correspondence with the heating time, and such half polymers have good fluidity in spite of the fact that a crosslinking agent is employed.

EXAMPLE 20

To 100 parts by weight of butyl acrylate as a monomer, 0.46 part by weight of N,N,N',N'-tetraethylthiuram disulfide as an iniferter was mixed to obtain a mixture having a uniform composition. 5 g of the obtained mixture was poured into a vial, sealed and then left to stand in an oil bath at about 100° C., whereby it became a half polymerized state. As a result, viscosity increase was observed, and a half polymer was obtained.

Then, the rate of polymerization of the obtained half polymer was calculated by NMR measurement, and the molecular weight was measured in the same manner as in Example 1. As a result, the rate of polymerization was about 18 wt %, and the number average molecular weight was about 35,800.

Further, the above half polymer was stored under a light-shielding condition for about 2 weeks at a low temperature (5° C.), whereupon analysis was carried out in the same manner, whereby no change was observed in the rate of polymerization and the number average molecular weight, and no progress in polymerization during this period was observed. Thus, it was confirmed that the half polymer was excellent in stability during the storage.

Then, the obtained half polymer was put into a vial again and left to stand in an oil bath at about 100° C., whereupon polymerization was resumed and completed to obtain a polymer.

On the other hand, the obtained half polymer was poured into a sample bottle and irradiated with light rays by the above-mentioned black light from a distance of 15 cm, whereupon polymerization was resumed and completed to obtain a polymer.

EXAMPLE 21

To 100 parts by weight of butyl methacrylate as a monomer, 0.42 part by weight of N,N,N',N'-tetraethylthiuram disulfide as an iniferter was mixed to obtain a mixture having a uniform composition. 5 g of the obtained mixture was poured into a vial, sealed and then left to stand in an oil bath at about 100° C., whereby it became a half polymerized state. As a result, viscosity increase was observed, and a half polymer was obtained.

Then, the rate of polymerization of the obtained half polymer was calculated by NMR measurement, and the molecular weight was measured in the same manner as in Example 1. As a result, the rate of polymerization was about 29 wt %, and the number average molecular weight was about 53,600.

Further, the above half polymer was stored under a light-shielding condition for about 2 weeks at a low temperature (5° C.), whereupon analyses were carried out in the same manner, whereby no change was observed in the rate of polymerization and the number average molecular weight, and no progress in polymerization during this period was observed. Thus, it was confirmed that the half polymer was excellent in stability during the storage.

Then, the obtained half polymer was put into a vial again and left to stand in an oil bath at about 100° C., whereupon polymerization was resumed and completed to obtain a polymer.

On the other hand, the obtained half polymer was poured into a sample bottle and irradiated with light rays by the above-mentioned black light from a distance of 15 cm, whereupon polymerization was resumed and completed to obtain a polymer.

EXAMPLE 22

To 100 parts by weight of styrene as a monomer, 0.57 part by weight of N,N,N',N'-tetraethylthiuram disulfide as an iniferter was mixed to obtain a mixture having a uniform composition. 5 g of the obtained mixture was poured into a vial, sealed and then left to stand in an oil bath at about 100° C., whereby it became a half polymerized state. As a result, viscosity increase was observed, and a half polymer was obtained.

Then, the rate of polymerization of the obtained half polymer was measured by NMR measurement, and the molecular weight was measured in the same manner as in Example 1. As a result, the rate of polymerization was about 47 wt %, and the number average molecular weight was about 28,900.

Further, the above half polymer was stored under a light-shielding condition for about 2 weeks at a low temperature (5° C.), whereupon analyses were carried out in the same manner, whereby no change was observed in the rate of polymerization and the number average molecular weight, and no progress in polymerization during this period was observed. Thus, it was confirmed that the half polymer was excellent in stability during the storage.

Then, the obtained half polymer was put into a vial again and left to stand in an oil bath at about 100° C., whereupon polymerization was resumed and completed to obtain a polymer.

On the other hand, the obtained half polymer was poured into a sample bottle and irradiated with light rays by the above-mentioned black light from a distance of 15 cm, whereupon polymerization was resumed and completed to obtain a polymer.

EXAMPLE 23

To 100 parts by weight of butyl methacrylate as a monomer, 0.42 part by weight of N,N,N',N'-tetraethylthiuram disulfide as an iniferter was mixed to obtain a mixture having a uniform composition. 5 g of the obtained mixture was poured into a sample bottle and then irradiated with light rays by the above-mentioned black light from a distance of from 15 cm to attain a half polymerized state. As a result, viscosity increase was observed, and a half polymer was obtained.

Then, the rate of polymerization of the obtained half polymer was calculated by NMR measurement, and the molecular weight was measured in the same manner as in Example 1. As a result, the rate of polymerization was about 19 wt %, and the number average molecular weight was about 62,400.

Further, the above half polymer was stored under a light-shielding condition for about 2 weeks at a low temperature (5° C.), whereupon analyses were carried out in the same manner, whereby no change was observed in the rate of polymerization and the number average molecular weight, and no progress in polymerization during this period was observed. Thus, it was confirmed that the half polymer was excellent in stability during the storage.

Then, the obtained half polymer was put into a vial and left to stand in an oil bath at about 100° C., whereupon polymerization was resumed and completed to obtain a polymer.

On the other hand, the obtained half polymer was poured into a sample bottle again and irradiated with light rays by the above-mentioned black light from a distance of 15 cm, whereupon polymerization was resumed and completed to obtain a polymer.

EXAMPLE 24

To 100 parts by weight of styrene as a monomer, 0.57 part by weight of N,N,N',N'-tetraethylthiuram disulfide as an iniferter was mixed to obtain a mixture having a uniform composition. 5 g of the obtained mixture was poured into a sample bottle and then irradiated with light rays by the above-mentioned black light from a distance of 15 cm to attain a half polymerized state. As a result, viscosity increase was observed, and a half polymer was obtained.

Then, the rate of polymerization of the obtained half polymer was calculated by NMR measurement, and the molecular weight was measured in the same manner as in Example 1. As a result, the rate of polymerization was about 31 wt %, and the number average molecular weight was about 16,200.

Further, the above half polymer was stored under a light-shielding condition for about 2 weeks at a low temperature (5° C.), whereupon analyses were carried out in the same manner, whereby no change was observed in the rate of polymerization and the number average molecular weight, and no progress in polymerization during this period was observed. Thus, it was confirmed that the half polymer was excellent in stability during the storage.

Then, the obtained half polymer was put into a vial and left to stand in an oil bath at about 100° C., whereupon polymerization was resumed and completed to obtain a polymer.

On the other hand, the obtained half polymer was poured into a sample bottle again and irradiated with light rays by the above-mentioned black light from a distance of 15 cm, whereupon polymerization was resumed and completed to obtain a polymer.

From the results of Examples 20 to 24, it is evident that when a process which comprises preparing a half polymer by using an iniferter and then preparing a polymer, is employed, the half polymer is excellent in the storage stability in a half polymerized state, and polymerization can be resumed and completed by such a simple operation as irradiating light or heating in such a state.

According to the process for producing a shaped product of the present invention, it is possible to prepare a shaped product which has a small polymerization shrinkage and which is substantially in the same shape as desired. Accordingly, the process for producing a shaped product of the present invention is useful for the production of a shaped product for which a high level of dimensional precision is required, such a an ocular lens, or for the production of a curing compound which is free from voids after curing.

What is claimed is:

1. A process for producing a shaped product, which comprises polymerizing a mixture comprising an iniferter and a radical polymerizable monomer by applying a light energy, a heat energy or a combination thereof to obtain a partially polymerized mixture having a conversion of from 5 to 90 wt %, filling the partially polymerized mixture in a predetermined cavity and then applying a light energy, a heat energy or a combination thereof again to the partially polymerized mixture to complete polymerization, wherein the iniferter is at least one compound selected from the group consisting of an aminoxy compound, a selenium compound, a diselenide compound and a diphenylethane derivative.

2. The process for producing a shaped product according to claim 1, wherein the iniferter is used in an amount of from 0.005 to 10 parts by weight per 100 parts by weight of the radical polymerizable monomer.

3. The process for producing a shaped product according to claim 1, wherein the radical polymerizable monomer is a monomer containing a polymerizable unsaturated double bond selected from the group consisting of an acryloyl group, a methacryloyl group, a vinyl group and an allyl group.

4. The process for producing a shaped product according to claim 1, wherein the shaped product is a lens or an optical fiber.

* * * * *